United States Patent
Huttunen et al.

(10) Patent No.: US 7,885,229 B2
(45) Date of Patent: Feb. 8, 2011

(54) METHOD, APPARATUS AND COMPUTER PROGRAM FOR SELF-ADJUSTING SPECTRUM SENSING FOR COGNITIVE RADIO

(75) Inventors: Anu Hannele Huttunen, Helsinki (FI); Jari Junell, Espoo (FI); Juha Hermanni Pihlaja, Helsinki (FI)

(73) Assignee: Nokia Corporation, Espoo (FI)

( * ) Notice: Subject to any disclaimer, the term of this patent is extended or adjusted under 35 U.S.C. 154(b) by 121 days.

(21) Appl. No.: 12/080,693

(22) Filed: Apr. 3, 2008

(65) Prior Publication Data

US 2009/0252178 A1   Oct. 8, 2009

(51) Int. Cl.
   *H04W 4/00*   (2009.01)
(52) U.S. Cl. .................... 370/329; 370/341
(58) Field of Classification Search ............ None
   See application file for complete search history.

(56) References Cited

U.S. PATENT DOCUMENTS

| | | | |
|---|---|---|---|
| 6,768,721 B1 * | 7/2004 | Schmitz et al. | 370/248 |
| 2008/0069041 A1 | 3/2008 | Tandai et al. | 370/329 |
| 2008/0095042 A1 * | 4/2008 | McHenry et al. | 370/217 |
| 2008/0137634 A1 | 6/2008 | Hassan et al. | 370/343 |
| 2008/0159208 A1 * | 7/2008 | Kloker et al. | 370/329 |
| 2008/0261537 A1 * | 10/2008 | Chen | 455/68 |
| 2009/0054095 A1 * | 2/2009 | Corke et al. | 455/509 |
| 2009/0161610 A1 | 6/2009 | Kang et al. | 370/329 |
| 2009/0247201 A1 * | 10/2009 | Ye et al. | 455/509 |

FOREIGN PATENT DOCUMENTS

| | | |
|---|---|---|
| CN | 1829385 A | 9/2006 |
| GB | 2431548 A | 4/2007 |
| GB | 2447148 A | 9/2008 |
| KR | 20070041343 A | 4/2007 |
| WO | WO-2007/094604 A1 | 8/2007 |

OTHER PUBLICATIONS

Simon Haykin, "Cognitive Radio: A look into the future of wireless communications and engineering challenges presented by its implementation", http://soma.crl.mcmaster.ca; Apr. 2006, pp. 1-12.

(Continued)

*Primary Examiner*—Chi H Pham
*Assistant Examiner*—Soon-Dong D Hyun
(74) *Attorney, Agent, or Firm*—Harrington & Smith

(57) ABSTRACT

A cognitive radio determines a frequency channel of a spectrum, determines from a locally stored association of individual channels to either of at least two categories (e.g., in use and backup, other is a third category) a selected category for the determined frequency channel. From the selected category is determined a time at which to sense the determined frequency channel. The determined frequency channel is then sensed at the determined time and results of the sensing may be transmitted. Timers may be associated with each of the categories and adjusted based on density of cognitive nodes. A timer for the in use category is shortest, a timer for the other category is longest, and a timer for the backup category is between shortest and longest.

14 Claims, 4 Drawing Sheets

OTHER PUBLICATIONS

Jarmo Lunden et al., "Censoring for Collaborative Spectrum Sensing in Cognitive Radios", Proc. Of the 41st Asilomar Conference on Signals, Systems, and Computer, Pacific Grove, CA, USA, Nov. 4-7, 2007, 6 pgs.

Carlos Cordeiro et al., "IEEE 802.22: The First Worldwide Wireless Standard Based On Cognitive Radios", IEEE International Symposium On New Frontiers In Dynamic Spectrum Access Networks, Nov. 8, 2005, pp. 328-337, XP010855130.

Laskar, J., et al., "Reconfigurable RFICs and Modules for Cognitive Radio", © 2006, IEEE, pp. 283-286.

Yang, J., et al., "Addressing the Dynamic Range Problem in Cognitive Radios", © 2007, IEEE, pp. 5183-5188.

Luu, L., et al., An Adaptive Weaver Architecture Radio with Spectrum Sensing Capabilities to Relax RF Component Requirements, © 2007, IEEE, pp. 538-545.

Chia-Han Lee et al. "Multiple Access-Inspired Cooperative Spectrum Sensing for Cognitive Radio," Oct. 29, 2007, pp. 1-6, XP031232378.

Hyoungsuk Jeon et al. "Notification Protocol of Sensing Information in Cognitive Radio System," Sep. 21, 2007, pp. 1377-1380, XP031261523.

Paulo Marques et al. "Sensing Opportunities in UMTS Spectrum," Aug. 1, 2007, pp. 492-496, XP031276097.

Tao Luo et al. "Maximum Likelihood Ratio Spectrum Dectedtion Model for Multicarrier Modulation Based Cognitive Radio Systems," Sep. 1, 2007, pp. 1698-1701, XP031147697.

Ghurumuruhan Ganesan et al. "Spatiotemporal Sensing in Cognitive Radio Networks;" Sep. 1, 2007, pp. 1-5, XP031168098.

Ganesan G et al. "Agility improvement through cooperative diversity in cognitive radio," Nov. 28, 2005, pp. 2505-2509.

* cited by examiner

METHOD, APPARATUS AND COMPUTER PROGRAM FOR SELF-ADJUSTING SPECTRUM SENSING FOR COGNITIVE RADIO

CROSS REFERENCE TO RELATED APPLICATION

This application includes subject matter related to U.S. patent application Ser. No. 12/001,623, filed on Dec. 11, 2007 and entitled METHOD AND APPARATUS TO SELECT COLLABORATING USERS IN SPECTRUM SENSING, the contents of which are hereby incorporated by reference in their entirety.

TECHNICAL FIELD

The teachings herein relate generally to wireless networks and devices operating in such networks, and are particularly related to sensing spectrum used in a cognitive radio network.

BACKGROUND

Cognitive radios systems use spectrum in an opportunistic manner. The cognitive radio system will search for underutilized spectrum channels in order use them in an agile manner. The cognitive radio is obliged to avoid disturbing the other radio systems (primary subscribers or primary users) that are operating on the same spectrum band. The underutilized frequency channels are found by spectrum sensing.

Spectrum sensing is generally a continuous task: the frequency channels that are used in the cognitive radio network have to be constantly monitored in case a primary user appears in the channel. Thus, optimizing the power-efficiency of spectrum sensing is essential when the cognitive radio nodes are mobile, battery operated devices. It is not power-efficient to perform the same spectrum sensing functionality in each spectrum sensing node in the cognitive radio network. One way to reduce the load of a single node is to perform the spectrum sensing collaboratively, such as is described in the above-referenced US patent application. The spectrum band that is monitored for cognitive use is divided into frequency channels. Each node is sensing a different frequency channel at different sensing time instance. The spectrum sensing results are then shared among the collaborating nodes. Thus, not every node has to sense all frequency channels, but instead the task is split in the frequency domain among the nodes in the same cognitive radio network. If there are more nodes than frequency channels, some nodes will perform spectrum sensing in the same frequency channel simultaneously. This is desired since it allows for diversity gains in the face of propagation and fading and helps to avoid the so-called hidden node problem, in which the primary user cannot be detected by using a single terminal due to channel propagation effects such as shadowing or fading.

As described in that referenced patent application, the collaborative spectrum sensing may be realized by a pseudorandom time-frequency code. The spectrum sensing is performed simultaneously at the collaborating nodes at a sensing time instance. The frequency channel that one node is sensing in a certain sensing time instance is generated by a pseudorandom code that is stored in the memory of the node. The node will perform sensing at the different frequency channels in a pseudorandom order which is determined by the code. Using this scheme, one can avoid the hidden node problem since effectively, different nodes sense different frequency channels at different time instances. Also, there is no need for centralized control to coordinate collaborative spectrum sensing. However, in certain user scenarios the power consumption and load of the network of the spectrum sensing policy described in that patent application may be reduced using embodiments of the invention detailed herein.

Also in the spectrum sensing field, a censoring for collaborative spectrum sensing has been detailed in a paper by J. Lunden, V. Koivunen, A. Huttunen, and H. V. Poor, entitled "CENSORING FOR COLLABORATIVE SPECTRUM SENSING IN COGNITIVE RADIOS", Proc. of the $41^{st}$ Asilomar Conference on Signals, Systems, and Computers, Pacific Grove, CA, USA, Nov. 4-7, 2007. In this censoring approach, only relevant information is transmitted between the collaborating nodes. The detection result (i.e., the statistic value) is sent to other users when it is larger than a predetermined censoring threshold. If the detection result is less than the censoring threshold, the result is not sent. The censoring threshold is set by a communications rate constraint which determines the probability of sending the detection result under a null hypothesis, i.e., when there is no signal present. The communications rate constraint can be set very low and then the detection result is transmitted to collaborating users practically only when the signal is detected. When no signal is detected the test statistic value is sent with low probability which is defined by the communication rate constraint. There can alternatively be two or more censoring regions. For example, there can be two censoring thresholds so that very low and very high test statistic values are sent.

What is needed in the art is a further improvement upon power conservation in cognitive radios during the spectrum sensing phase of their operation, preferably in a manner that also reduces the network load.

SUMMARY

In accordance with one embodiment of the invention there is a method that includes determining a frequency channel of a spectrum, determining from a locally stored association of individual channels to one of at least two categories a selected category for the determined frequency channel, determining from the selected category a time at which to sense the determined frequency channel, and sensing the determined frequency channel at the determined time.

In accordance with another embodiment of the invention there is an apparatus that includes a processor, a memory and a receiver that together are configured to determine a frequency channel of a spectrum, to determine a selected category for the determined frequency channel from an association stored in the memory of individual channels to one of at least two categories, to determine from the selected category a time at which to sense the determined frequency channel, and to sense the determined frequency channel at the determined time.

In accordance with another embodiment of the invention there is a computer readable memory embodying a program of machine-readable instructions executable by a digital data processor to perform actions directed toward selecting a time at which to sense a channel of a spectrum. In this embodiment the actions include determining a frequency channel of a spectrum, determining from a locally stored association of individual channels to one of at least two categories a selected category for the determined frequency channel, determining from the selected category a time at which to sense the determined frequency channel, and sensing the determined frequency channel at the determined time.

In accordance with another embodiment of the invention there is an apparatus that includes processing means, storage means and receiving means. Together these means are for determining a frequency channel of a spectrum, for determining a selected category for the determined frequency channel from an association stored in the storage means of individual channels to one of at least two categories, for determining from the selected category a time at which to sense the determined frequency channel, and for sensing the determined frequency channel at the determined time and for transmitting results of the sensing. In a particular embodiment, the processing means is a digital data processor, the storage means is a computer readable memory storing a program, and the receiving means is a wireless transceiver for communication over a cognitive radio system.

In accordance with another embodiment of the invention is a method that includes determining a density of cognitive radio nodes operating in a cognitive radio network, selecting at least one of a channel to sense and a time at which to sense a channel based at least in part on the determined node density, and sensing a portion of a cognitive radio spectrum according to the selection. In a particular embodiment the determined density is used to determine a time at which to sense a frequency channel of the cognitive radio spectrum, then the frequency channel is sensed at the determined time and results of the sensing are transmitted so long as they exceed a censoring threshold. Various exemplary approaches are detailed below for estimating node density. The node density teachings may be combined with any other teaching herein, such as the channel categories, timers associated with the categories, when to sense and transmit results, that results from one channel category are sent at an earlier time and/or more frequently than results from a different channel category (e.g., for 'in use' channels the sensing results for an individual channel that exceed the censoring threshold are sent per time interval, while for 'backup' channels the results for a group of channels that exceed the censoring threshold are sent only after multiple time intervals), and the like. Apart from the method, this same aspect of the invention may also be embodied as an apparatus and/or a computer program stored on a memory.

These and other aspects of the invention are detailed more particularly below.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

As noted above, the inventors have determined that in certain use case scenarios, there may be an opportunity for improving the power conservation aspects of the approach to collaborative sensing set forth in the incorporated reference, as well as reducing the network load. One such use case is when there are a high number of cognitive radios (generically, nodes) in a system. When the node density is high, it becomes unnecessary for each node to do sensing at every sensing time instance. One node will receive a sufficient amount of information from other nodes and thus would waste power by doing what is then unnecessary spectrum sensing. In another use case scenario, which may be separate from or in combination with the one above, the cognitive radio system will not necessarily use all frequency channels that are being monitored. It follows then that those channels that are used less often or unused in the overall cognitive system need not be tracked at all times. According to an aspect of this invention is dynamically managing the load of spectrum sensing on an individual node basis, and preferably autonomously within each node so as to reduce signaling overhead as compared to some master or control node making decisions for other nodes and signaling them with the results. In this manner, embodiments of the invention help to increase the total power efficiency of the collaborative spectrum sensing system and to reduce the load of the network caused by reporting what in those use case scenarios would include in at least some instances unnecessary measurement results. Combining this aspect with the censoring scheme noted above can be used to reduce the network load even more than when only censoring is used.

Figure 1A:
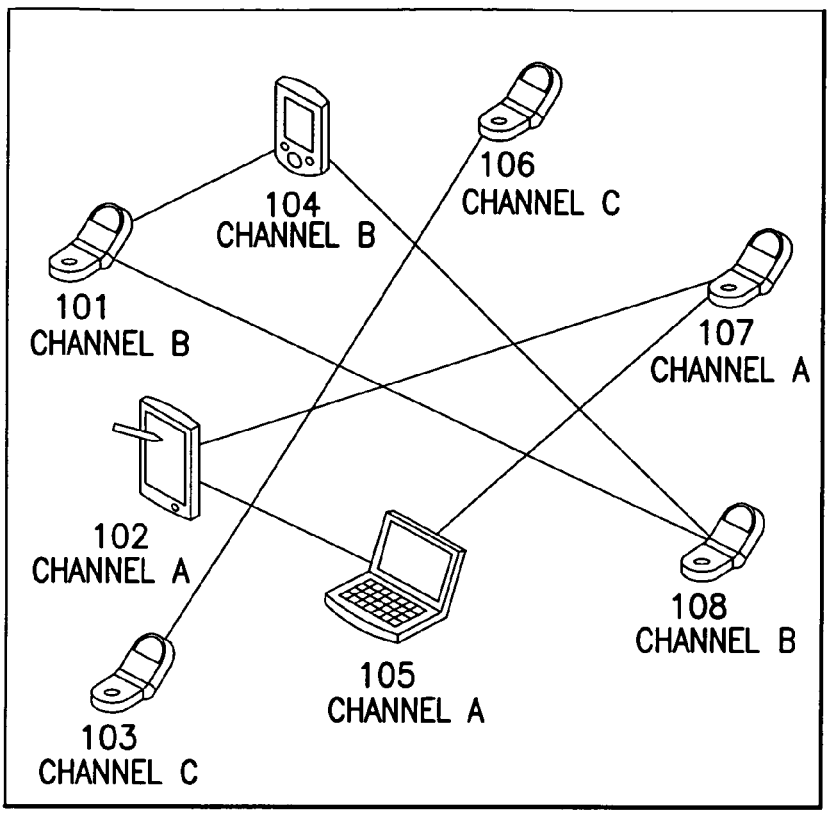
FIGS. 1A-1B illustrate constellations of terminals wherein different subsets of the terminals sense different portions of the spectrum at different time intervals, as detailed in incorporated U.S. patent application Ser. No. 12/001,623.
Figure 1B:
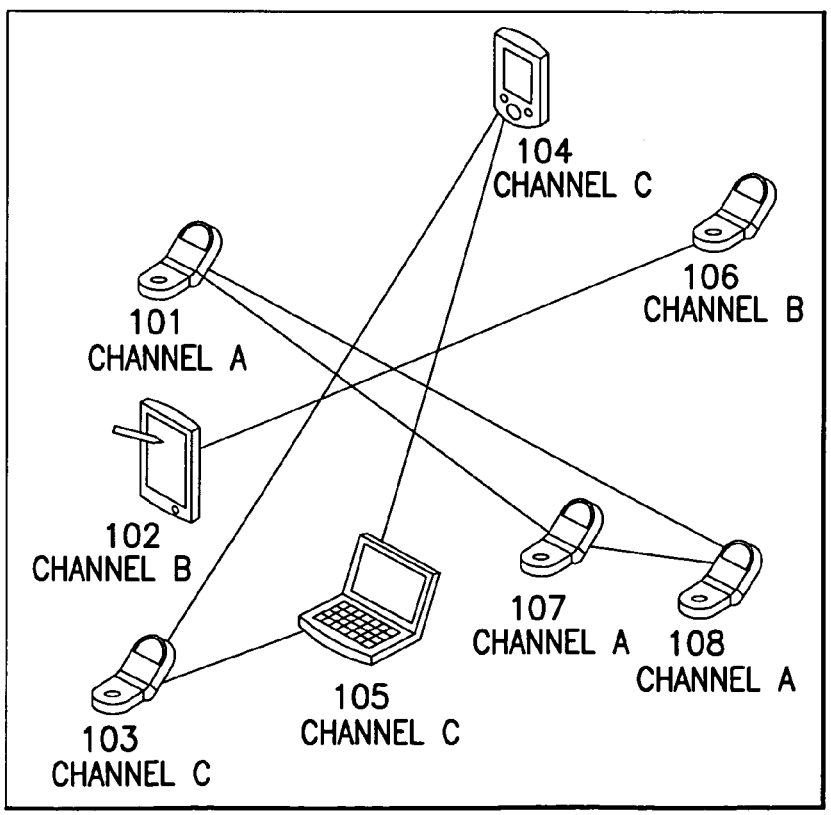

Before detailing specific aspects of this invention, the referenced application is summarized with reference to FIGS. 1A-1B. The collaboration scheme is implemented so the mobile terminals/nodes can select the frequencies and collaboration partners without the specific, centralized control messages for each individual collaboration node. Preferably two or more nodes at different locations sense the same channel at the same time for diversity purposes, as least for the channels that are in use in the cognitive system, and generally not all of the mobile terminals in a system are always necessary for proper spectrum sensing.

The collaborating users that perform the spectrum sensing are selected in a pseudorandom manner such that the subset of collaborating users for each channel of the overall spectrum (spectrum channel) are formed and always changed after a certain period of time. There are N cognitive users in the wireless system within a considered area (e.g., within a cell), where N is an integer greater than one in the minimum. In the referenced application the number of collaborating users M (positive integer less than N) for a particular channel and timeslot is selected based on the operating frequency band $\Delta F$ and the total number of cognitive users N that are engaged in spectrum sensing, as well as the time granularity needed for the measurements.

FIGS. 1A and 1B illustrate groupings of mobile stations for sensing purposes in each of a first time interval (t) and a second time interval (T+t). As above, there are N cognitive users in the network, and for FIGS. 1A-1B N=8 by example.

The N cognitive users 101-108 performing spectrum sensing are designated for a particular channel at a particular timeslot using a pseudorandom sequence generator. Thus each of the N=8 cognitive users 101-108 will change the channel it is observing in a pseudo-random way through all the channels A-C of interest at predetermined times known to all of the cognitive users. Hence, the pseudorandom sequences can be considered to be time-frequency codes where users hop to another part of the spectrum in each time slot. The net combination of the channels A-C are designated to be sensed by the combination of the N cognitive users (e.g., channel A by collaborating subset $M_A$ of the N cognitive users, channel B by collaborating subset $M_B$ of the N cognitive users, and so on). The particular pseudorandom sequence or its generator should be known to each cognitive user.

The observed data from the sensed channel can be analyzed by the user using a spectrum sensing algorithm such as a cyclostationary feature detection, energy detection or likelihood ratio test. It can alternatively be sensed by a matched filter having its filter parameters matched to a known waveform that is expected to be present on the channel being sensed. Any of these can be used to generate a test statistic for the sensed spectrum, generally termed the spectrum sensing results or analysis results. The analysis results can be sent to a fusion center which analyses the combined results of the collaborating users for that channel and slot as well as for other channels and slots for the other cognitive users, and makes a decision about which channels are being used and which channels are empty and may be used by cognitive radios. Or the cognitive users can send the analysis results to other cognitive users, which can then merge the information from the other cognitive users to form a decision if there is unused spectrum available.

The channels A, B, C that are collaboratively analyzed by the spectrum sensing scenario of this invention do not have to form a continuous frequency band but the different parts of the spectrum to be sensed can be scattered in frequency, if needed.

So from the perspective of the individual terminal, the incorporated application has the terminal pseudorandomly select from a designated spectrum a first channel in a first time interval, determine a first analysis result by sensing the first channel during the first time interval, transmit the first analysis result, pseudorandomly select from the designated spectrum a second channel in a second time interval, determine a second analysis result by sensing the second channel during the second time interval, and transmit the second analysis result. This pseudorandom selection is done by a plurality of such terminals simultaneously, so that all of the K channels are covered in each of the time intervals, which would generally extend beyond only two time intervals and continues until it is determined that spectrum sensing may no longer be needed. The first and second channels may be pseudorandomly selected by indexing a series of channels in the designated spectrum and executing an algorithm that pseudorandomly selects one of the indices for the first and second time intervals by use of a seed number and a pseudorandom sequence generator (e.g., by disposing the indices in a pseudorandom order).

Now embodiments of the present invention are detailed. As above, the spectrum sensing task is divided frequency-wise into channels and the nodes perform spectrum sensing in collaboration. Different nodes sense different frequency channels and share information with other nodes. The frequency channel which one node is sensing is determined by a frequency hopping sequence stored in the memory of the node, such as the pseudorandom sequence generator that selects, for each node and each time interval, an index associated with one of the frequency channels. According to an aspect of this invention, the frequency channels are categorized so that in each category the spectrum sensing is done with a different time cycle. The more critical the channel is to the cognitive radio network, the more often the spectrum sensing is performed. The time cycle of the spectrum sensing is set in each node depending on how many nodes are collaborating in the spectrum sensing. The more nodes are participating, the less often any individual node has to measure (statistically).

Three categories are given as an example to illustrate this aspect:
Category 1: channel in use in cognitive radio network, to be measured at each sensing time instance.
Category 2: backup channel, measured somewhat often. Measurements are performed every Lth sensing time instance.
Category 3: channel that is neither in use or backup, it is measured infrequently. Measurements are performed every Jth frequency hopping sequence.

In the above formulation, backup channel means that the channel is taken into use if one of the in-use channels becomes unusable, e.g., a primary user from a cellular system is detected at the in-use channel. In category 3, which is measured least frequently, there are channels where a primary user has been detected or high interference levels have been measured. Also, if there are more underutilized channels than needed for the cognitive radio operation (the in-use channels) and backup, they can also be set to this category.

The categories also determine how often the spectrum sensing results are transmitted to other users. Below is an example of how the reporting frequency may be associated with the different categories:
Category 1: if a primary user is detected, send the sensing result immediately (not awaiting the full hopping sequence, see FIG. 2).
Category 2: if a primary user is detected, send the sensing result immediately.
Category 3: send results after measuring a full frequency hopping sequence.

Once a new node appears at the cognitive radio network, it will receive information about which channels are in use and which are the backup channels. The node will list which frequency channels belong to which category in its local memory. Then the node will receive the spectrum sensing information from other nodes in the cognitive radio network. Based on the information it receives, it will conclude how often it will need to do sensing in each category.

The spectrum sensing can be done less frequently (from the perspective of any individual node) when the node density is high in the cognitive radio network, i.e., there are many nodes in the network in a geographically limited area. Then it is not necessary for one node to do sensing in each sensing period. Instead, one node can receive sensing results from other nodes while not doing any sensing itself, and save power. In one implementation of this there is a timer related to each channel category indicating how often the spectrum sensing is to be performed on those channels. The timer is set based on the node density in the cognitive radio network, as well as based on the category associated with that particular timer. The node density can be estimated using the information sources: how many results you receive from other nodes, from power control information, and from the maximum hop count the received packets have experienced.

In practice, the self-adjusting collaboration may be implemented using a number of timers in each node that will indicate the time when the spectrum sensing task is to be performed. There may be a different timer for each channel category in each node. Alternatively, there might be one or several categories that do not have a timer related to them and one or several categories that do have timers related to them. Nominally, spectrum sensing is to be performed once in each frame/beacon interval of the cognitive radio network. An individual node determines which frequency channel it is to sense (e.g., pseudorandom sequence generator that gives the index for the channel). According to embodiments of this invention, before the node hops to the determined frequency channel to do its sensing, it first finds the category for that frequency channel, and checks whether the timer for the selected channel category has expired. If the timer has expired, then the node will perform sensing. If the timer has not expired, then the node will not sense at that sensing time instance (e.g., frame or beacon interval).

Figure 2:
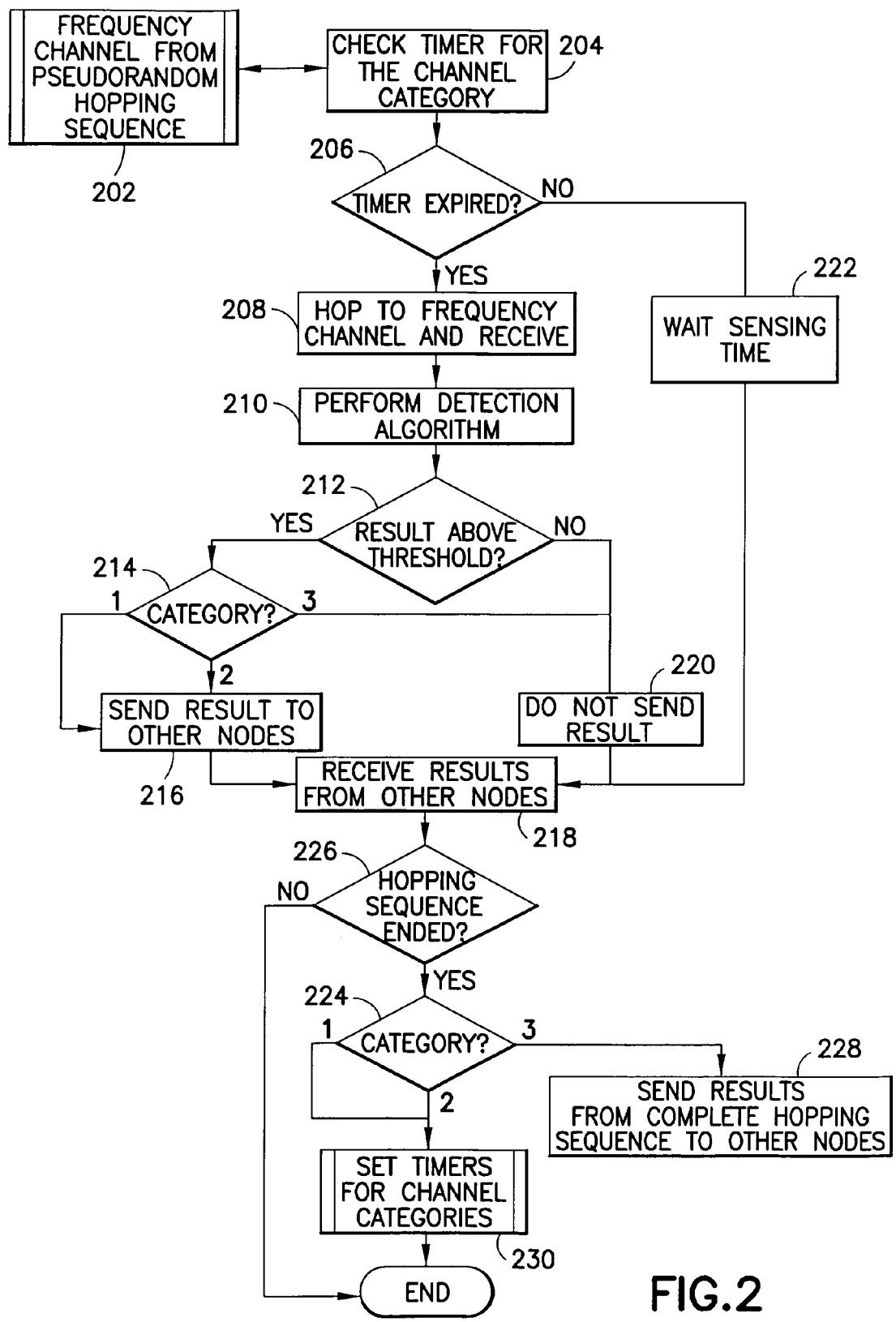
FIG. 2 is a process flow diagram according to an embodiment of the invention for self-adjusting within an individual sensing node its portion of collaborative detection.

This is detailed at FIG. 2, which is from the perspective of an individual node that autonomously determines its frequency channel and timing, independent of the other nodes in the cognitive radio network. At block 202 the node determines its frequency channel, such as by the pseudorandom generator that hops about a list of the channels. Each channel of that list is associated with one of the channel categories. Most simply, the node associates channels explicitly with category 1 or 2 since those are being routinely sensed and reported in the cognitive radio network, and all other channels not explicitly category 1 or 2 are by default category 3. Note that while the category 1 and category 2 channels are routinely sensed, the different timers for those different categories may designate the sensing at different periods. Below is detailed certain options as to how the node determines the channel 1 and 2 categories. The hopping sequence is simply the sequence through that list of channels by which the node hops, which as above may be pseudorandomly.

At block 204 the node checks the category from the channel-category list stored in its local memory and determines the category for the channel selected at block 202, and then checks the timer for that category. If at block 206 the timer associated with the determined category has expired, then at block 208 the node hops to the frequency channel determined at block 202 and sensed the spectrum there. At block 210 it performs some detection algorithm (e.g., cyclostationary feature detection or others noted above) to determine a test statistic. The value of that test statistic is used in a hypothesis test as to whether there is actually a signal present in the sensed channel at the sensing time. For example, the test statistic value may be evaluated against a censoring threshold, and the result of this algorithm is then transmitted to other cognitive users (or a central/fusion node) according to the censoring scheme (e.g., only send the results that indicate [statistically] that a signal is present). The censoring scheme itself is also a power saving feature, in that it reduces transmission by any of the cognitive radios to only those test statistic results that are relevant. If at block 212 the block 210 analysis of the sensed spectrum exceeds some predetermined threshold, then at block 214 the node checks the category and sends the results of block 210 to the other nodes at block 216. If it was a category 3 channel out of block 214, or if the threshold at block 212 was not exceeded, then the results are not sent per block 220. When a node receives the test statistics that the other nodes have sent, it adds them together and performs its own hypothesis test based on which the node can determine whether there is a signal or not. Thus performance with censoring is nearly as good as performance without censoring, but with potentially a much reduced load on the network as far as overhead for communicating spectrum sensing results.

Note also that if the timer for the appropriate channel category has not expired at block 206, then by block 222 the node waits the sensing interval (e.g., one timeslot or the shortest of the three category timers which in an embodiment is the timer for category 1 channels) but does no sensing of that channel due to non-expiration of the corresponding channel category timer. Instead it is a passive node and only receives other nodes' reports at block 218.

Other nodes are performing the same functions of FIG. 2, so the individual node receives at block 218 the results from those other sensing and reporting nodes, and categorizes those received results by channel categories 1 (in use), 2 (backup) or 3 (other). For categories 1 and 2, the node uses the sensing results it receives from other nodes to set timers at block 230. The timers can also be set based on node density estimation which can be acquired in several different ways. This is detailed further below. The node will only send at block 228 the results for category 3 channels (every frequency channel in the list) that exceed the censoring threshold once it has results for each of those channels. This is in contract to category 1 and 2 channels that are routinely reported according to the censoring scheme. This is because the category 3 channels are by definition not critical to operation of the cognitive radio system and so can be reported more infrequently, and thus save transmission overhead. A new node who arrives in the cell or cellular region in which the cognitive radio system operates will get information of the category 1 and 2 channels sooner than for the category 3 channels since the former channels are reported more frequently.

As shown at FIG. 2, the timer values are set after each frequency hopping sequence. The length of the frequency hopping sequence arises from the number of channels: if there are 100 channels then one frequency hopping sequence spans 100 time intervals since that is how long it would take to measure every one of the channels one time. A variation is detailed below, but however defined the frequency hopping sequence is repetitive and at least as long as the time it takes to measure each channel once given the sensing time interval. The timer values can also be modified so that in each category the timers are set after each sensing time instance or the timers can be set differently for category 1-2 and 3 if needed. For example, in categories 1 and 2 one can set timers after each sensing time instance. In category 3 one can set timers after each frequency hopping sequence.

Consider a specific example from the perspective of the overall cognitive radio network. Assume that there are N=200 nodes and K=50 channels. There are K1=2 channels that belong to category 1. There are K2=3 channels that belong to category 2. And there are K3=45 channels that belong to category 3. Assume that the target number T of collaborating users is T1=4 for category 1 channels (2 sensing nodes per channel in each time frame), T2=2 for category 2 channels, and T3=1 for category 3 channels. Every node will be nominated to sense one channel per frame. They will perform the sensing depending on the timer value.

From the perspective of one node, an exemplary implementation of its operation would be as follows. The frequency channel is determined by the frequency hopping sequence as at block 202. The node checks which category the channel belongs to. Then depending on channel category, the operation is:

Category 1: measure always and send if results exceed threshold at block 212 (e.g., send results immediately).
Category 2: measure every 2nd frame and send if results exceed threshold at block 212.
Category 3: measure all category 3 channels during the same frequency hopping sequence. Send results after every (for example) $4^{th}$ frequency hopping sequence per block 228 (and do not measure during the other 3 of the 4 hopping sequences).

In category 3, one can assume that different nodes measure during different hopping sequences on average since each node sets its timer values independently. In the above embodiment, since the number of channels is equal to the number of sensing time intervals in a full frequency hopping sequence, the category 3 results (that exceed the censoring threshold) are sent after a number of sensing time intervals that equal the number of channels that are in the channel-to-category association list stored at the cognitive radio node (or a multiple thereof as in the example above where category 3 results are sent only once per four hopping sequences). In an alternative embodiment, the number of sensing time intervals in a full frequency hopping sequence may be greater than the number of channels, such as for example where one or more channels occurs more than once in a full hopping sequence. For example, within one frequency hopping sequence a particular category 3 channel can be sensed twice while all other category 3 channels are sensed only once. This allows some additional flexibility in the rate at which that particular channel is sensed without changing that channel to category 1 or 2. Broadly stated, different channels that are each within a same channel category are sensed with a different sensing rate (a different frequency per hopping interval) by a single cognitive radio sensing node.

From the perspective of the cognitive radio network, the extreme cases for information transmission could be:

Category 1:
If a primary user is detected in all channels, $K1*T1=2*4=8$ nodes will send detection results. This rarely happens in used channels.
If no primary user is detected in any channel, then censoring defines how many of the nodes will transmit, e.g. $K1*T1*1/1000$ (practically zero in small networks)

Category 2:
If a primary user is detected in all channels, $K2*T2=3*2=6$ nodes will send detection results. This rarely happens in backup channels.
If a primary user is not detected in any channel, then censoring defines how many will transmit, e.g. $K2*T2*1/1000$.

Category 3:
If a primary user is detected in all channels, $K3*T3=45*1=45$ nodes will send detection results after each frequency hopping sequence.
If no primary user is detected in any channel, then censoring defines how many will transmit, e.g. $K3*T3*1/1000$.
Category 3 results are sent after the frequency hopping sequence has passed, i.e., not after each sensing time instance. This reduces transmission overhead. In this example the frequency hopping sequence is 50 sensing cycles long.

In practice, the situation would nearly always end up between the two extreme cases noted for the different categories above.

Figure 3:
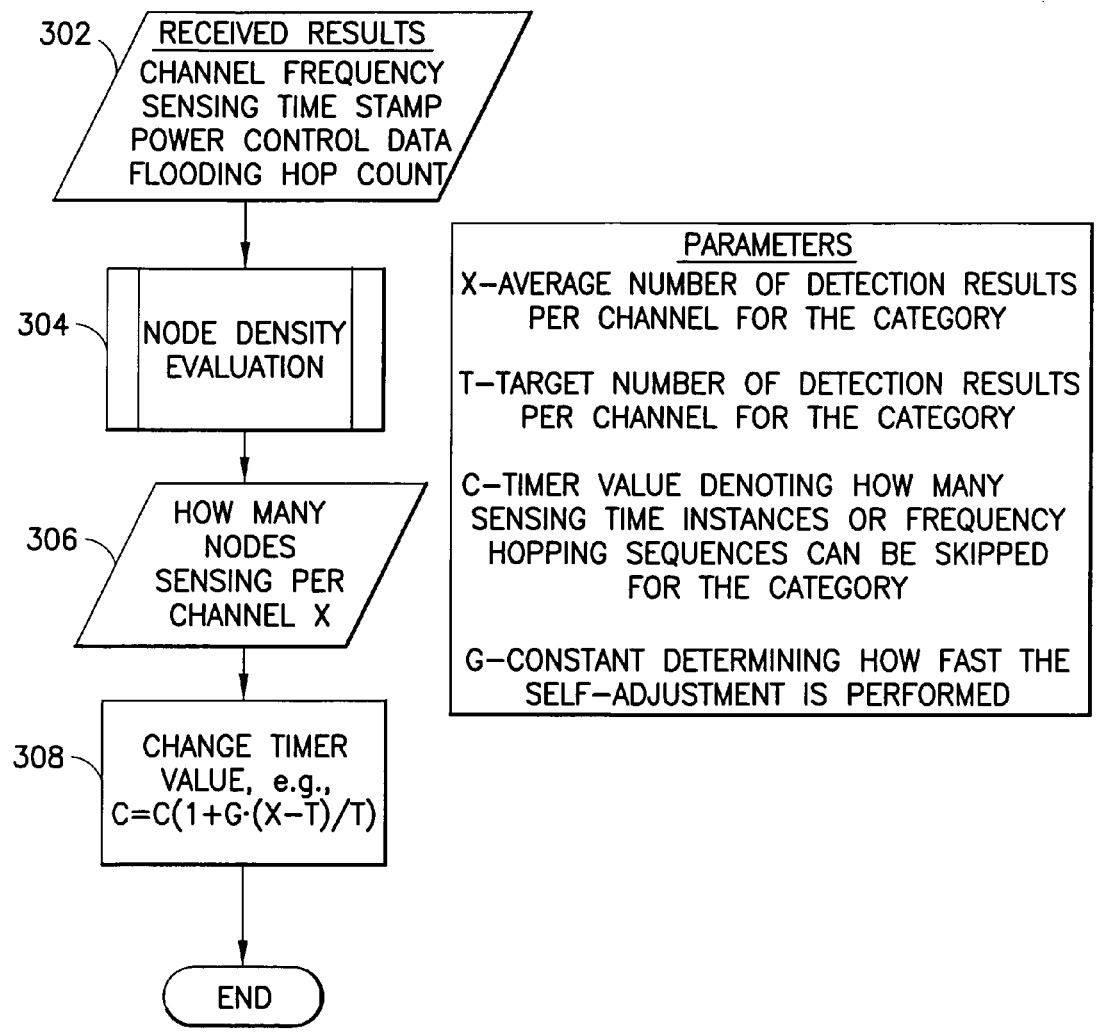
FIG. 3 is a process flow diagram according to an embodiment of the invention for the individual sensing node to adjust its timer value(s).

The timer values can also be made to depend on the density of nodes, as is detailed at FIG. 3. The more nodes there are in the cognitive radio network the less often one node needs to measure. The node density can be estimated in several different ways, some of which are summarized at block 302. The node can estimate the number of nodes participating in collaborative sensing from how many detection results it has received from other nodes. Or the node can estimate how many nodes are in a geographically limited area from power control information and from the hop count in flooding, detailed below. Or the node can send the timer values it has calculated along with the detection results to other nodes. The node will receive similar timer values form other nodes in the cognitive radio system, which gives it an indication of the node density. The node density estimation can be also a combination of some or all of these examples. When a new node appears in the cognitive radio network, it is anticipated that it will take a while to estimate the node density to set initial values for the timers before joining the collaborative sensing regimen. Or the joining node can ask one of its neighbors for the initial timer values.

In the simplest case, the node density can be evaluated directly from the number of detection results that it receives. This is the case when one is monitoring the channels that are in primary use. Then after every frequency hopping sequence every node that was sensing will transmit the results. Thus, the number of received detection results is a straightforward reference of how many nodes are participating in the collaboration in each channel.

As a simple example, assume a node has timer value $C=5$ for category 3 channels. This means that the node will measure every $5^{th}$ frequency hopping sequence the channels in category 3. Further assume that the target is to receive the results from $T=2$ nodes per channel. The node then calculates how many results it has received on average from the channels at that category. Assume that the node has received $X=10$ results per channel. Then the node will increase the timer value for that category. It can be increased, for example, according to $C=C(1+G*(X-T)/T)=5(1+0.3*(10-2)/2)=11$, where C will always be rounded to the nearest integer. Thus the node's timer value for category 3 channels is raised from 5 to 11. During the next frequency hopping sequence the node then needs to measure channels in that category every 11 frequency hopping sequences. The constant $G=0.3$ determines how fast the timer value reflects the collaborative situation: the smaller the value, the slower the node adapts to the situation. The parameter values T and G are different for each category. Alternatively, the timer values can be calculated by using a decimal number c and using $c=c(1+G*(X-T)/T)$. Then the timer value is set to the nearest integer $C=INT(c)$. The decimal value would be used in the calculation of the new value for C. The timer values can be set also taking into account the timer values of other collaborating nodes if they are available in order to make the system more stable in a sense that the nodes have similar timer values to each other.

For the case where a node is monitoring channels where there is no traffic, the node will also not receive detection results from other nodes when the censoring scheme is applied. In censoring, each node has determined how many nodes will send detection results to other nodes in the situation that they do not detect a signal. This value can be very low to avoid control signaling that is of minimal value, e.g., $1/1000$. Two different operating scenarios of interest are then the cognitive radio network with either very few nodes or very many nodes.

If the cognitive radio network has a small amount of nodes: individual nodes do not receive results from empty channels. There is no information transmission to burden the cognitive radio network. Every node will monitor these channels.

If the cognitive radio network has many nodes (e.g. cognitive system in a football stadium): each node receives some detection results from empty channels, and the number is defined by the censoring scheme. Thus one can estimate the node density based on the received results. Individual nodes can increase their timer value as above, and thereafter sense less frequently.

Another option is to set the timer values for all channels depending on the number of received results from a channel that is in primary use. It can be assumed that there are approximately the same amount of nodes sensing all frequency bands.

As noted briefly above, the node density can be estimated also using the information that is generated in the device power control and flooding. There is a predefined number of nearest neighbors for each node. The transmission power is then scaled to keep the number of nearest neighbors within some bounds, as is known in the art for spread spectrum communications. The power information gives some rough estimate of the distance between nodes. For example, in free space when transmission power increases 6 dB, the propagation distance doubles. Such simple relations can be used to estimate the distance given the power control adjustment that is sent over the air interface.

The flooding message includes information about the hop count, the number of nodes through which a packet/message has traveled between source and destination (e.g., in a network with relays). Using these figures, any node can roughly estimate how many nodes there are in the network. From the hop count an individual node can estimate the radius of the network, and from the power information one can estimate the distance between nodes. However, by this approach alone the node has no knowledge about the density of nodes in the network that lie beyond that node's nearest neighbors. In addition, from the power control information and the hop count any individual node can conclude what is the geographical size of the network. The collaborating nodes have to be situated so that they are approximately within the same primary user networks.

As can be seen from the detailed explanation above, embodiments of this invention present a low-complexity, self-adjusting method to control collaborative spectrum sensing without centralized control. Such embodiments also increases the power efficiency of the spectrum sensing because unnecessary measurements can be avoided, and also reduce the needed signaling overhead (on average) in collaborative spectrum sensing since sensing results can be sent to other nodes less frequently.

Figure 4:
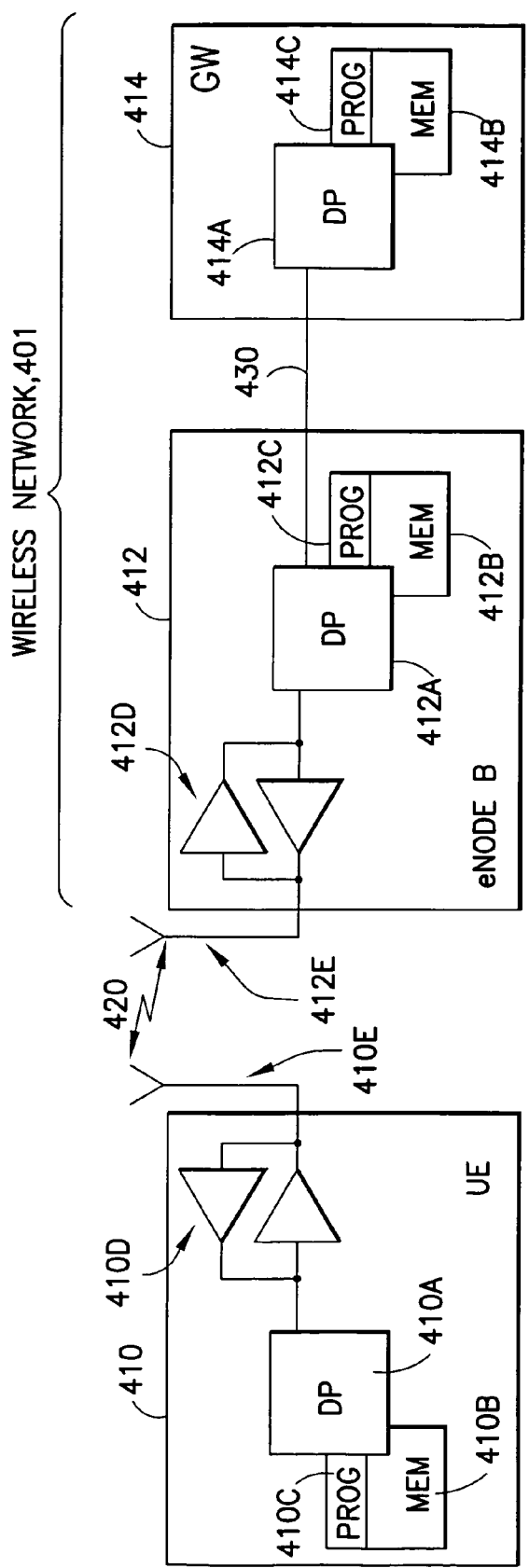
FIG. 4 is a simplified block diagram of various electronic devices that are suitable for use in practicing the exemplary embodiments of this invention.

Reference is now made to FIG. 4 for illustrating a simplified block diagram of various exemplary electronic devices that are suitable for use in practicing the exemplary embodiments of this invention. In FIG. 4 a (hierarchical) wireless network 401 is adapted for communication between an exemplary UE 410 and a Node B 412 (e-Node B/base station/central node). Alternatively, the exemplary UE 410 need not have any contact with the network 401 and simply use its best efforts to avoid collisions over the air interface with the primary users of that network 401 as well as avoiding air interface collisions with the network 401 itself. The network 401 may include a gateway GW/serving mobility management entity MME/radio network controller RNC 414 or other radio controller function known by various terms in different wireless communication systems. The exemplary UE 410 includes a data processor (DP) 410A, a memory (MEM) 410B that stores a program (PROG) 410C, and a suitable radio frequency (RF) transceiver 410D (e.g., receiver and transmitter) coupled to one or more antennas 410E (one shown) for bidirectional wireless communications with other cognitive radios, and in some embodiments also over one or more wireless links 420 with the Node B 412.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The Node B 412 also includes a DP 412A, a MEM 412B, that stores a PROG 412C, and a suitable RF transceiver 412D coupled to one or more antennas 412E. The Node B 12 may be coupled via a data path 430 (e.g., Iub or S1 interface) to the serving or other GW/MME/RNC 414. The GW/MME/RNC 414 includes a DP 414A, a MEM 414B that stores a PROG 414C, and a suitable modem and/or transceiver (not shown) for communication with the Node B 412 over the data link 430.

At least one of the PROGs 410C, 412C and 414C is assumed to include program instructions that, when executed by the associated DP, enable the electronic device to operate in accordance with the exemplary embodiments of this invention, as detailed above. Inherent in the DPs 410A, 412A, and 414A is a clock to enable synchronism among the various apparatus for transmissions and receptions within the appropriate time intervals and slots required.

The PROGs 410C, 412C, 414C may be embodied in software, firmware and/or hardware, as is appropriate. In general, the exemplary embodiments of this invention may be implemented by computer software stored in the MEM 410B and executable by the DP 410A of the UE 410 and similar for other MEMs and DPs of other UEs in the cognitive radio network, or by hardware, or by a combination of software and/or firmware and hardware in any or all of the devices shown. For example: the sequence generator may be a PROG stored in a MEM; and the timers may be software tracking an oscillator of the DP 410A.

In general, the various exemplary embodiments of the UE 410 can include, but are not limited to, mobile terminals/stations, cellular telephones, personal digital assistants (PDAs) having wireless communication capabilities, portable computers (e.g., laptops) having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions and sensor networks.

The MEMs 410B, 412B and 414B may be of any type suitable to the local technical environment and may be implemented using any suitable data storage technology, such as semiconductor-based memory devices, magnetic memory devices and systems, optical memory devices and systems, fixed memory and removable memory. The DPs 410A, 412A and 414A may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software (computer readable instructions embodied on a computer readable medium), logic or any combination thereof. For example, some aspects such as the sequence generator and/or timers may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation such as FIGS. 2 and 3, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits ICs is by and large a highly automated process. Complex and powerful software tools are available for converting a logic level design into a semiconductor circuit design ready to be etched and formed on a semiconductor substrate. FIG. 3 may represent specific circuit functions of such an IC.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

We claim:

1. A method comprising:
   determining by an apparatus a frequency channel of a spectrum;
   receiving by the apparatus information on which channels are in use and which channels are backup;
   locally storing by the apparatus an association of the channels in use with one of at least two categories and an association of the backup channels with another of the at least two categories;
   determining by the apparatus, from the locally stored association of the channels, a selected category for the determined frequency channel, the selected category comprising one of in use and backup and neither in use nor backup;
   determining by the apparatus from the selected category a time at which to sense the determined frequency channel, wherein the determined time is sooner for a case where the selected category is in use, and the determined time is later for a case where the selected category is backup, and the determined time is later than the backup category for a case where the selected category is neither in use nor backup; and
   sensing by the apparatus the determined frequency channel at the determined time.

2. The method of claim 1, further comprising:
   transmitting the results of the sensing, wherein transmitting is at a first time for the case that the selected category is a first of the at least two categories and at a second time that is later than the first time for the case that the selected category is a second of the at least two categories.

3. The method of claim 2, wherein transmitting the results of the sensing comprises transmitting only those results of the sensing that exceed a censoring threshold.

4. A method comprising:
   determining by an apparatus a frequency channel of a spectrum;
   determining by the apparatus, from a locally stored association of individual channels to one of at least two categories, a selected category for the determined frequency channel;
   determining by the apparatus from the selected category a time at which to sense the determined frequency channel by sensing an expiration of a timer associated with the selected category; and
   sensing by the apparatus the determined frequency channel at the determined time;
   wherein for a case that the selected category is in use the associated timer expires upon each sensing time instance, and for a case that the selected category is backup the associated timer expires after a plurality of sensing time instances that equals the number of the individual channels.

5. A method comprising:
   determining by an apparatus a frequency channel of a spectrum;
   determining a node density in a cognitive radio network;
   determining by the apparatus, from a locally stored association of individual channels to one of at least two categories, a selected category for the determined frequency channel;
   determining by the apparatus from the selected category and from the determined node density a time at which to sense the determined frequency channel; and
   sensing by the apparatus the determined frequency channel at the determined time;
   wherein determining the node density comprises estimating the node density for the selected category from how many spectrum sensing results are received from other nodes in the cognitive radio network and by averaging received spectrum sensing results for all channels of the selected category.

6. A method comprising:
   determining by an apparatus a frequency channel of a spectrum;
   receiving power control information;
   determining a node density in a cognitive radio network by estimating the node density for a geographical area from the received power control information and from a hop count;
   determining by the apparatus, from a locally stored association of individual channels to one of at least two categories, a selected category for the determined frequency channel;
   determining by the apparatus from the selected category and from the determined node density a time at which to sense the determined frequency channel; and
   sensing by the apparatus the determined frequency channel at the determined time.

7. A method comprising:
   determining by an apparatus a frequency channel of a spectrum;
   determining a node density in a cognitive radio network;
   determining by the apparatus, from a locally stored association of individual channels to one of at least two categories, a selected category for the determined frequency channel;
   determining by the apparatus from the selected category and from the determined node density a time at which to sense the determined frequency channel;

sensing by the apparatus the determined frequency channel at the determined time; and transmitting timer values for timers associated with each of the at least two categories and receiving timer values from other nodes for the other nodes' timers associated with each of the at least two categories, wherein determining the node density comprises estimating the node density from the received timer values.

8. An apparatus comprising a processor and a memory storing computer readable instructions,
in which the processor is configured with the memory and the computer readable instructions to cause the apparatus at least to:

determine a frequency channel of a spectrum, receive information on which channels are in use and which channels are backup, and the memory is configured to store an association of the channels in use with one of the at least two categories and to store an association of the backup channels with another of the at least two categories;

determine from the association of the channels stored in the memory a selected category for the determined frequency channel, the selected category comprising one of in use and backup and neither in use nor backup;

determine from the selected category a time at which to sense the determined frequency channel, and sense the determined frequency channel at the determined time wherein the determined time is sooner for a case where the selected category is in use, and the determined time is later for a case where the selected category is backup, and the determined time is later than the backup category for a case where the selected category is neither in use nor backup.

9. The apparatus of claim 8, further comprising a transmitter, and wherein the apparatus is configured to transmit the results of the sensing at a first time for the case that the selected category is a first of the at least two categories and at a second time that is later than the first time for the case that the selected category is a second of the at least two categories.

10. The apparatus of claim 9, wherein the processor is configured with the memory and the computer readable instructions to further cause the apparatus to compare the results of the sensing to a censoring threshold and to transmit only those results of the sensing that exceed the censoring threshold.

11. An apparatus comprising a processor and a memory storing computer readable instructions,
in which the processor is configured with the memory and the computer readable instructions to cause the apparatus at least to:

determine a frequency channel of a spectrum, determine a selected category for the determined frequency channel from an association stored in the memory of individual channels to one of at least two categories, determine from an expiration of a timer that is associated with the selected category a time at which to sense the determined frequency channel, and sense the determined frequency channel at the determined time wherein for a case that the selected category is in use the associated timer expires upon each sensing time instance, and for a case that the selected category is backup the associated timer expires at after a plurality of the sensing time instances that equals the number of the individual channels.

12. An apparatus comprising a processor and a memory storing computer readable instructions,
in which the processor is configured with the memory and the computer readable instructions to cause the apparatus at least to:

determine a frequency channel of a spectrum, determine a selected category for the determined frequency channel from an association stored in the memory of individual channels to one of at least two categories;

determine a node density in a cognitive radio network;

determine from the selected category and the node density a time at which to sense the determined frequency channel, and sense the determined frequency channel at the determined time;

in which the node density is determined by estimating the node density for the selected category from how many spectrum sensing results are received from other nodes in the cognitive radio network and by averaging the received spectrum sensing results for all channels of the selected category.

13. The apparatus of claim 12, further comprising a receiver that is configured to receive power control information, and wherein the processor is configured with the memory and the computer readable instructions to cause the apparatus to determine the node density by estimating the node density for a geographical area from the received power control information and from a determined hop count.

14. The apparatus of claim 12, further comprising a transmitter and a receiver, wherein the transmitter is configured to transmit timer values for timers associated with each of the at least two categories and the receiver is configured to receive timer values from other nodes for the other nodes' timers associated with each of the at least two categories, and wherein the processor is configured with the memory and the computer readable instructions to cause the apparatus to determine the node density by estimating the node density from the received timer values.

* * * * *